June 11, 1968 E. S. BUSH 3,388,404

INFORMATION RECORDING DEVICE

Filed Aug. 16, 1966 3 Sheets-Sheet 1

INVENTOR

EUGENE S. BUSH, DECEASED,

BY WINIFRED K. BUSH, ADMINISTRATRIX

BY Eugene M. Eckelman

ATTORNEY

INFORMATION RECORDING DEVICE

Filed Aug. 16, 1966 3 Sheets-Sheet 2

INVENTOR
EUGENE S. BUSH, DECEASED,
BY WINIFRED K. BUSH,
ADMINISTRATRIX

BY Eugene M. Eckelman
ATTORNEY

INFORMATION RECORDING DEVICE

Filed Aug. 16, 1966 3 Sheets-Sheet 3

INVENTOR
EUGENE S. BUSH, DECEASED,
BY WINIFRED K. BUSH,
ADMINISTRATRIX

BY Eugene M. Eckelman
ATTORNEY

United States Patent Office 3,388,404

Patented June 11, 1968

3,388,404

INFORMATION RECORDING DEVICE

Eugene S. Bush, deceased, late of Milwaukie, Oreg., by Winifred K. Bush, executrix, 6818 SE. Harmony Road, Milwaukie, Oreg.

Filed Aug. 16, 1966, Ser. No. 572,860
6 Claims. (Cl. 346—24)

ABSTRACT OF THE DISCLOSURE

The recording device is primarily intended for recording the operation of vehicles on a tape. It includes a first stylus operated by a take-off from the speedometer cable for recording the speed on a graph appearing on one side of the tape moving at a constant speed in the device. The take-off from the speedometer cable also drives a first stamping head for applying mileage markings to the tape and a second stamping head which stamps fractional markings associated with the mileage markings. A second stylus is employed for recording engine performance markings on a second graph on the tape. The recording device is intended for use with a double layer of recording tape and has structure wherein after the data are printed on the tape the layers are separated from each other. One layer passes between drive rolls for pulling the tape assembly at the constant speed. This layer is deposited in one compartment in the device. The other layer comprises the layer that receives the markings and is deposited in a separate compartment. Knife means are employed to sever this latter layer from the supply of tape.

This invention relates to new and useful improvements in information recording devices.

Recording devices have heretofore been employed in combination with vehicles or the like to log operations of the vehicle and more particularly operation of the vehicle motor. Some of these recording devices are principally directed to logging engine operations such as revolutions per minute or manifold vacuum pressure. While this information is valuable to the vehicle operator, it is not sufficiently comprehensive to show other important functions of vehicle operation. Such other functions of vehicle operations may be directed to the scheduled running of the vehicle. Also, devices heretofore employed made no provision for easy inspection of recorded tape in the order in which data were imprinted thereon.

It is a primary objective of the present invention to provide an information recording device for vehicles adapted to overcome the objectionable features in prior devices as enumerated above, and furthermore to imprint on tape a combination of vehicle management data comprising motor operation, mileage designations, time intervals, speed, as well as a write-in area for making hand written notations by the operator. A recording device having the same primary objective has been illustrated and claimed in applicant's Patent No. 3,200,403, and it is another object of the present invention to provide a recording device having a more simplified and novel arrangement incidental to providing vehicle management data.

More specific objects of the present invention are to provide a recording device having a novel mounting arrangement for internal parts whereby to have convenient access to the interior of a supporting housing for the purpose of assembly or maintenance as well as to reload the device with tape on which data are to be imprinted; to provide a novel tape holding and drive assembly for tape on which data are to be imprinted; to provide a novel stylus structure and arrangement for marking on the tape; and to provide novel mileage marking means facilitating a more accurate reading of mileage designations imprinted on the tape.

Still another object is to provide a novel tape structure arranged to receive imprinted data thereon, and particularly means for establishing an accurate reading of mileage designations.

Additional objects will become apparent from the following specification and claims, considered together with the accompanying drawings, wherein the numerals of reference indicate like parts and wherein:

Figures 1, 10, 11:
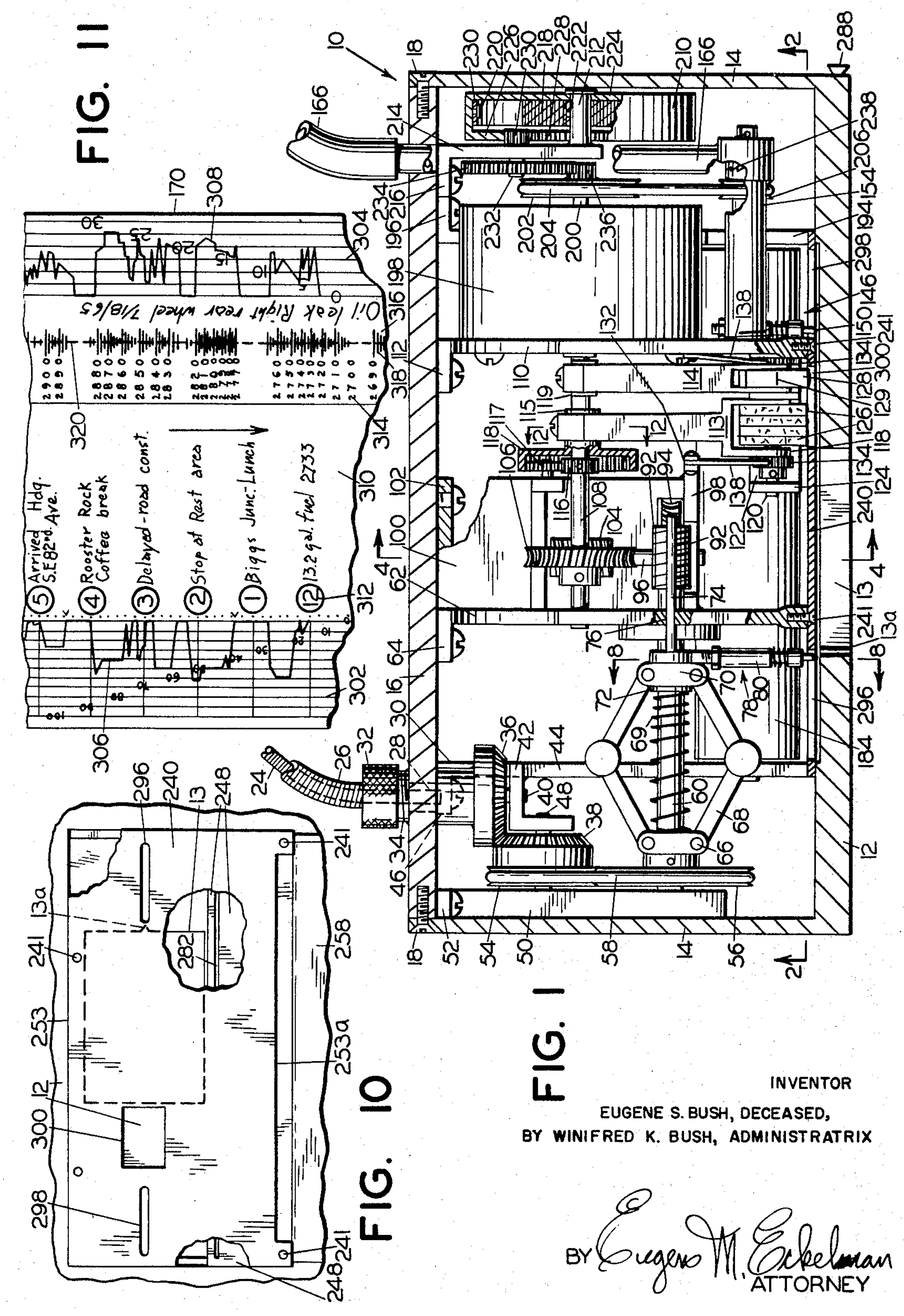
FIGURE 1 is a horizontal sectional view of the present information recording device taken on the line 1—1 of FIGURE 2.
FIGURE 10 is a fragmentary sectional view taken on the line 10—10 of FIGURE 3.
FIGURE 11 is a face view of a portion of tape utilized in combination with the present invention.
Figures 2, 7, 8, 9, 12:
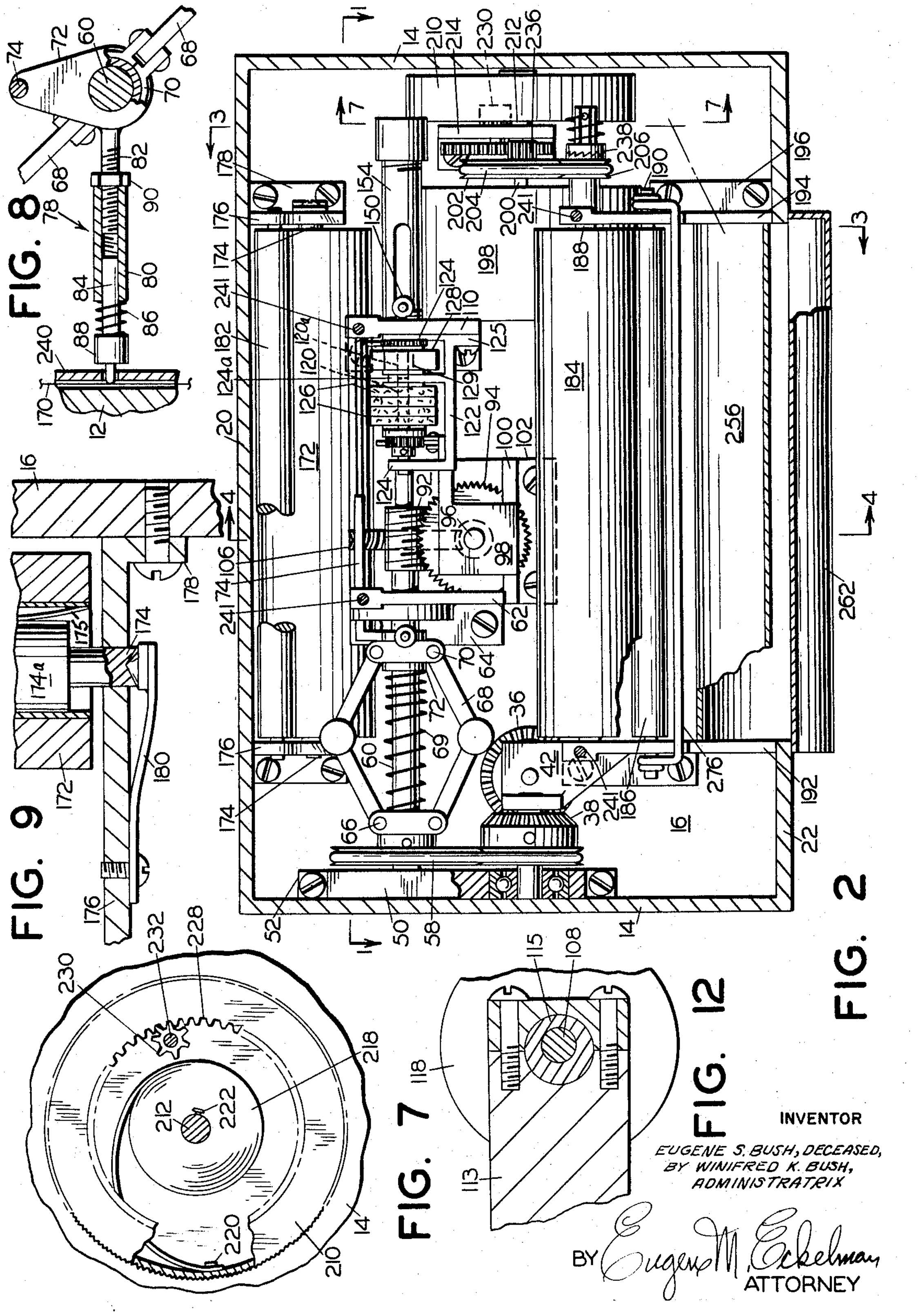
FIGURE 2 is a vertical sectional view taken on the line 2—2 of FIGURE 1 and having parts thereof broken away.
FIGURE 7 is an enlarged, fragmentary sectional view taken on the line 7—7 of FIGURE 2.
FIGURE 8 is an enlarged, fragmentary sectional view taken on the line 8—8 of FIGURE 1.
FIGURE 9 is an enlarged, fragmentary sectional view taken on the line 9—9 of FIGURE 3.
FIGURE 12 is an enlarged, fragmentary sectional view taken on the line 12—12 of FIGURE 1.
Figures 3, 4, 5, 6:
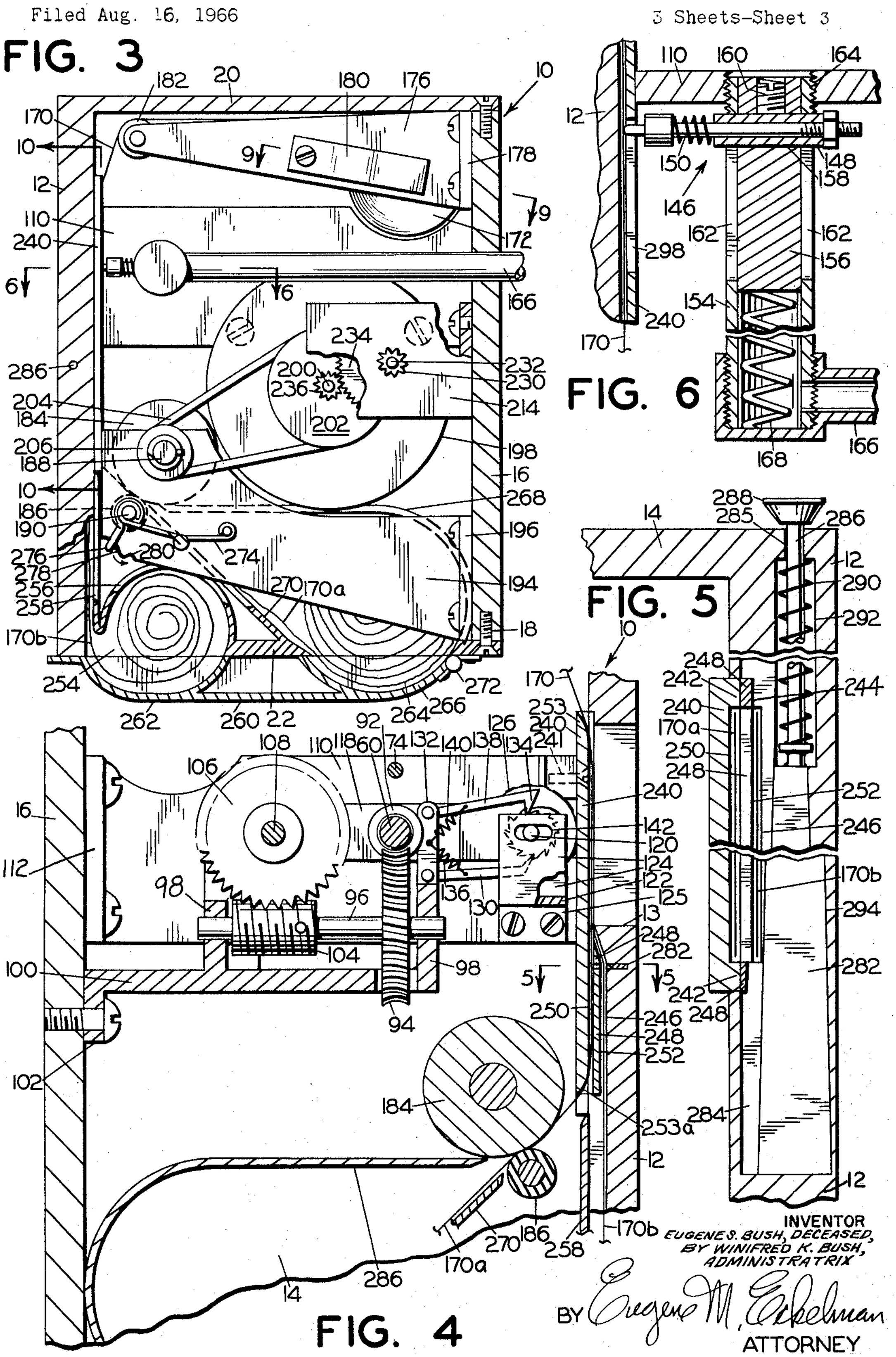
FIGURE 3 is a vertical sectional view taken on the offset line 3—3 of FIGURE 2 and also being partly broken away.
FIGURE 4 is an enlarged, vertical fragmentary sectional view taken on the line 4—4 of FIGURE 1.
FIGURE 5 is an enlarged, fragmentary sectional view taken on the line 5—5 of FIGURE 4.
FIGURE 6 is an enlarged, fragmentary sectional view taken on the line 6—6 of FIGURE 3.

With reference to the drawings, and particularly to FIGURES 1, 2 and 3, the apparatus of the present invention is incorporated in a housing 10 having a front wall 12 provided with a window 13, side walls 14 and a back wall 16. In a preferred construction, the front wall 12 and the side walls 14 comprise an integral structure and are removably attached to the back wall, such as by screws or any locking mechanism 18. The housing 10 also has top and bottom walls 20 and 22, respectively, forming an integral part of the front and side walls.

It is a feature of the present invention to mount the marking mechanism and the tape supporting and operating means entirely on the back wall 16 so that the front portion of the housing can be removed to expose the mechanism. Such mechanism will now be described.

Apparatus for inscribing one of the markings on the tape is driven by a take-off cable 24, FIGURE 1, enclosed in a casing 26 and driven by the vehicle drive shaft in a manner similar to a driving arrangement for a speedometer cable. Cable 24 has a non-circular end 28 having a removable drive connection with a hub 30 journaled in the back wall 16. The casing for the cable is attached to the back wall by means of a nut 32 having threaded engagement with a hollow externally threaded boss 34 integrated with the back wall 16. Hub 30 carries a bevel gear 36, also seen in FIGURE 2, which meshes with another bevel gear 38. Gear 36 has an end spindle 40 journaled in a right angle bracket 42 forming an integral upward extension of a forwardly extending bracket arm 44 secured to the back wall 16. Bracket arm 44 has a flanged end 46 for securement to the back wall.

Gear 38 is supported on a shaft or spindle 48 journaled at one end in the right angle bracket 42 and at its other end in a bracket arm 50 also secured to the back wall 16, as by means of a flanged portion 52 thereon.

Gear 38 has a pulley 54 secured thereto, and this pulley drives a second pulley 56 by means of a belt 58. Pulley 56 is secured on a shaft 60 having one end journaled in the bracket arm 50 and its other end journaled in another bracket arm 62 secured to the back wall 16 by means of a flanged end 64.

Secured to the shaft 60 for rotation therewith is a governor type member 66 having pivoted, expanding arms 68 controlled in their operation by a coil spring 69 on the shaft. Secured to the expandable portion of the member 66 is a split collar 70 which has rotative mounted support on a peripherally grooved bushing 72, also seen in FIGURE 8, rotatably receiving the shaft 60 and held in a non-rotative but lateral slidable position by a right angle arm 74 secured thereto and projecting slidably through an aperture 76 in the bracket arm 62. Thus, as the shaft 60 is rotated through its drive connection with take-off cable 24, the collar 70 will slidably position itself on the shaft 60 depending upon the speed of the latter, the collar 70 although being slidable on the shaft being held non-rotatably by the arm 74 which slides through the bracket arm 62.

Secured to the collar 70 is a forwardly projecting stylus 78, seen in detail in FIGURE 8. Stylus 78 comprises a housing 80 provided with a central bore the rearward end of which is threaded for threadedly receiving a mounting stud 82 secured to the bushing 72. The forward end of the housing 80 slidably receives a stylus pen 84 urged in a forward direction by a compression spring 86 on the pen and abutting between the forward end of the housing and an enlargement 88 on said pen. The forward or rearward positioning of the stylus is adjustable by the threaded disposition of the housing 80 on the stud 82, and the stylus is held in such adjusted position by a lock nut 90 on the stud 82. The floating mounting of the pen 84 in the housing and the forward or rearward adjustment of the housing is such that a selected pressure of the pen on a recording tape can be accomplished, as will be more full explained hereinafter.

Shaft 60 projects beyond the bracket arm 62, and secured on this projecting end of the shaft is a worm gear 92, FIGURES 1, 2 and 4, in mesh with a gear 94 secured on a shaft 96. As best seen in FIGURE 4, shaft 96 is journaled in a pair of vertical ears 98 on a forwardly extending bracket arm 100 secured to the back wall 16, the bracket arm 100 having a flanged end 102 to provide securement to said back wall.

Also secured on shaft 96 is a worm gear 104 which meshes with a gear 106 secured on a transversely extending shaft 108 journaled at one of its ends in the bracket arm 62 and at its other end in another bracket arm 110 also secured to the back wall 16 as by means of a flanged end 112.

Shaft 108 drives in linear motion a pair of arms 113 and 114 having bifurcated end portions, the method of such drive being explained hereinafter. A shaft 120 extends through the bifurcated end of arm 113 and a shaft **120*a*, FIGURE 2, extends through the bifurcated end of arm 114. A bracket 122 has upstanding ears 124 and 124*a* in which the shafts 120 and 120*a* are journaled and also has a flanged end portion 125, FIGURE 4, which provides for securement thereof to the bracket arm 110. Shaft 120 rotatably supports mileage designation wheels 126 between the bifurcated end of arm 113**, such wheels comprising conventional speedometer type wheels with the exception that numerical indicia are engraved thereon for the purpose of imprinting numerals on a tape.

Mounted on the shaft **120*a* and disposed between the bifurcated end of arm 114 is a marking wheel 128. This wheel has laterally extending raised lines 129** which are spaced around the wheel and are five in number. Such lines are of different length, and as will be more apparent hereinafter they are of an arrangement to form a triangular pattern on a tape for more accurately reading the mileage designations.

The driving structure for the arms 113 and 114 will now be described, and as illustrated herein the arm 113 is driven in a marking function every ten miles of travel of the vehicle and the arm 114 is driven in a marking function every two miles of travel of the vehicle. Such is only exemplary, however, since the marking interval of the said arms may vary.

With reference particularly to FIGURES 1 and 12, arm 113 has journaled engagement with a cam 115 in turn journaled on the shaft 108, the cam being arranged to provide linear motion of said arm as shaft 108 rotates. Cam 115 receives rotative drive through a gear reduction assembly comprising a pinion gear 116 secured on shaft 108 and driving another pinion gear 117 rotatably supported on arm 100 and meshing with an internal type gear 118 integrated with cam 115. The ratio of all the gearing is such that, as stated above, the arm 113 is driven in a marking function every ten miles of travel of the vehicle.

In order that the arm 114 will be driven in a marking function more often than the arm 113, namely, every two miles of travel of the vehicle rather than every ten miles, arm 114 has journaled engagement with a cam 119, FIGURE 1, secured directly to the shaft 108 rather than to ratio gearing as is arm 113.

The intervals of linear movement for marking by arms 113 and 114 depend upon the ratio of the pulleys 54 and 56 as well as the gears 92, 94 and 104, 106 and of course gears 116, 117, and 118. If it is necessary to vary the over-all ratio to maintain the constant selected interval by imprinting by the mileage designation wheels 126, as when vehicle tire size or other conditions are changed, such is accomplished by changing pulley sizes 54 and 56 or ratios of the gears to accomplish such over-all ratio.

As will be apparent hereinafter, the wheels 126 and 128 apply imprinting on the back side of the tape, and thus the marking numbers on the wheels must suitably be arranged for reverse printing.

Rotation of the wheels 126 and 128 is accomplished by dogs 130 and 138, FIGURES 1 and 4. The dogs 130 and 138 for the wheels 126 are pivotally mounted on an upstanding finger 132 secured to the front ear 98 of the bracket arm 100, and the dogs for the wheel 128 are pivotally mounted on bracket arm 110. These dogs engage ratchet wheels 134 secured to respective ones of the wheels 126 and 128 and are held in ratcheting engagement with such wheels by springs 136.

As best seen in FIGURE 4, shaft 120 projects through slots 142 in the supporting bracket ears 124 and **124*a*, whereby the cams 115 and 119 are arranged to drive the arms 113 and 114 forwardly and rearwardly in printing steps. As the arms 113 and 114 are driven forwardly and rearwardly, the dogs 130 and 138 rotate the ratchet wheels and consequently the wheels 126 and 128** to a new printing position.

The present device also employs third marking means comprising a second stylus 146, shown in FIGURES 1 and 6. Stylus 146 comprises a housing 148 having a central bore in which is slidably mounted a stylus pen 150 extending parallel to the stylus pen 84 and arranged to imprint a graph line on tape, as will be described. Stylus 146 is adapted to imprint a graph line which indicates engine performance such as vacuum conditions of the intake manifold or r.p.m. For this purpose, there is employed a cylinder 154 having a plunger 156 therein. This plunger has a transverse bore 158, and the stylus housing 148 is secured in this bore by set screw means 160. Cylinder 154 has opposed slots 162 for receiving the transversely disposed stylus housing 148. Cylinder 154 has a threaded end 164 for mounting support in bracket arm 110, and has an inlet connection with a conduit 166 leading from the motor intake manifold, the conduit 166 laeding into the cylinder at the end opposite from the stylus end. A compression spring 168 is disposed in the cylinder and the plunger is operative in the cylinder against the action of such spring by the manifold vacuum for moving the stylus in a graph marking operation.

The tape on which recordings are to be made by the present device is designated by the numeral 170, FIGURE 11, and feeds from a supply roll 172, FIGURES 2, 3 and 9. The supply roll 172 is supported on a shaft 174 mounted at its opposite ends in a pair of forwardly projecting bracket arms 176 secured to the back wall 16 of the housing, the bracket arms having flanged ends 178 to provide means for securement to such back wall. Shaft 174 is held in a roll mounting position by a latch finger 180 mounted on one of the bracket arms 176, the end of the shaft opposite from the latch end also projecting through an aperture in the other bracket arm. The shaft 174 has an integral core or drum **174*a* which is shorter than the shaft whereby when it is desired to remove the core it is merely moved axially toward the latch 180 to release the opposite shaft end from the other bracket arm 176. In a preferred construction, core 174*a* has a frictional engagement with the roll 172, and such may be accomplished by a curved leaf spring 175 which may comprise an attachment on the core or in the roll. The purpose of the frictional engagement just mentioned is to prevent free rolling of the roll 172 on the core in order that the tape will be tight in its removal from said roll. In this same regard, latch finger 180 by reason of its forced engagement with shaft 174** prevents free rotation of the shaft and core.

From the roll 172 the tape 170 passes over a guide roll 182, FIGURES 2 and 3, supported on the outer end of the bracket arms 176. The tape then passes downwardly along the inner side of front wall 12, as will be explained in greater detail hereinafter, and then moves between a friction drive roll 184 and a pressure roll 186. Drive roll 184 is mounted on a shaft 188 for rotation therewith, and pressure roll 186 is mounted on a shaft 190 for free rotation thereon, the latter two shafts being supported in bracket arms 192 and 194 secured to the back wall 16. Bracket arms 192 and 194 have flanged ends 196, FIGURE 3, for securement to the back wall.

Roll 184 is driven by a constant speed motor 198 secured to the bracket arm 110. Motor 198 has an output shaft 200 to which is secured a pulley 202 which drives a belt 204 in turn engaging and driving a pulley 206 on shaft 188. Motor 198 may be driven by the electrical system of the vehicle but preferably comprises a mechanically driven apparatus such as a spring driven clock motor. This motor has its own spring winding drive therein, and if desired an auxiliary drive mechanism FIGURES 1, 2 and 7, may be used to prolong the running time thereof without winding. Such auxiliary drive mechanism comprises a housing 210 journaled on a stub shaft 212 secured to a bracket arm 214 having the usual flanged end 216 for securement to the back wall 16. Enclosed in the housing 210 is a spiral spring 218 one end of which is anchored on a pin 220 secured to the housing and the other end of which is anchored on a pin 222 secured on shaft 212. The housing 210 has a full wall portion 224 on the one side to provide a journaled support on shaft 212 and on the other side has a wall 226 provided with a round opening the defining edge of which has gear teeth 228. Gear teeth 228 are in mesh with a small gear 230 secured on a shaft 232 journaled in the bracket arm 214 and carrying at its opposite end in secured relation a larger gear 234 in mesh with a small gear 236 secured on the output shaft 200 of the motor 188. It is thus apparent that by winding the housing 210 of the auxiliary drive mechanism power is applied through the various gears 230, 234 and 236 to the output shaft 200. While the spring 218 may comprise an auxiliary drive as described, it could as well serve as the main drive and the mechanism 198 enclose only the usual escapement mechanism for providing a constant speed. The use of mechanical spring drive rather than electrical drive insures continuous operation of the tape drive roll 184 since it is not dependent upon the operation of an electrical system.

Shaft 188 for the friction drive roll 184 and the pulley 206 are associated with a conventional one-way clutch 238 to permit rotative winding of the housing 210.

With particular reference to FIGURES 1, 3, 4 and 5, an auxiliary or back-up wall 240 is secured, as by screws 241, on the forward ends of bracket arms 44, 62, 110, and 194. Wall 240 has a pair of forwardly directed projections 242 on its front face adjacent the sides thereof which extend into a recessed portion 244 provided in the inner face of front wall 12. Front wall 12 also has a countersunk portion 246. Secured to the forward face of the wall 240 adjacent the bottom thereof, also by the screws 241 is a divider plate 248 which by means of the construction of wall 240 and the countersunk portion 246 of the front wall 12 forms a feed slot 250 on the rearward side thereof and a feed slot 252 on the front side thereof. The feed slot 250 extends the full height of the wall 240 and the feed slot 252 extends only through the vertical length of the divider plate 248. Back-up wall 240 has a top bevel 253 to permit smooth movement of the tape and also has a bottom slot **253*a* through which the tape feeds, the upper edge of slot 253*a*** being beveled.

The structure and arrangement of the divider plate 248 and the feed slots 250 and 252 are intended for use with a tape 170 composed of two strips or layers **170*a* and 170*b* which upon insertion of the roll in the housing are separated by the divider plate 248, FIGURES 4 and 5, with the layer 170*a* extending through feed slot 250 and the layer 170*b* extending through the feed slot 252. The tape is of a structure such that markings made on the back side of layer 170*a* are transferred to the layer 170*b*. Such may be accomplished by the use of carbon on the layer 170*a* or other well known pressure sensitive marking means thereon. At any rate, the front layer 170*b*** of the tape is transparent or semi-transparent whereby markings thereon can be viewed from the front or unmarked side of the tape.

With reference to FIGURES 3 and 4, the layer **170*b* of the tape is directed downwardly into a compartment 254 at the bottom of the housing which is defined by a transversely disposed, semi-cylindrical top wall or baffle 256 secured to the bottom wall 22 of the housing and having an upwardly directed front baffle 258 which forms an extension of auxiliary wall 240 to guide the tape layer 170*b* into the pocket 254. Pocket 254 is defined at the lower end thereof by an auxiliary bottom wall 260 having a transverse dished or concaved portion 262 in vertical alignment with the semi-cylindrical wall 256**.

The tape layer **170*a* leads through the feed slot 250 and then is directed between the drive roll 184 and the pressure roll 186 to a compartment 264 defined also in part by a dished or recessed portion 266 in the auxiliary wall 260. The compartment 264 is defined at its top by a contoured, transversely disposed baffle plate 268 the forward end of which terminates adjacent the drive roll 184. Tape layer 170*a* is guided downwardly into the compartment 264 by another baffle plate 270 extending angularly upwardly from said compartment and terminating adjacent the pressure roll 186**.

Thus, the tape layer **170*a* comprises the pulling layer of the tape for drawing it along the front wall of the housing and gathers in the compartment 264 whereas the tape layer 170*b* moves therewith but gathers in the compartment 254. Preferably the auxiliary bottom wall 260 of the housing is attached to said housing by spring pressed hinge means normally urging the wall 260 in a closed position. When it is desired to remove the tape the wall 260** is merely swung downwardly.

Shaft 190 and pressure roll 186 are supported by leaf springs 274, FIGURE 3, anchored on the bracket arms 192 and 194 and arranged to urge the roll 186 into firm engagement with the drive roll. When tape is to be threaded between the rolls 184 and 186 it is desirable that the pressure roll be retracted against the action of the spring, and for this purpose a U-shaped latch 276 is pivotally mounted on the shaft 190 and is adapted for engagement in one or the other of two notches 278 and 280 provided on the under edge of bracket arms 192 and 194.

These notches are arranged such that upon engagement of the latch 276 in the notch 278 the spring permits the pressure roll to bear up against the drive roll whereby to provide a driving engagement for the paper. When the latch 276 is moved into notch 280, the pressure roll 186 is pulled away from the drive roll 184 to provide easy insertion or removal of the tape layer 170*a*.

It is desirable that the tape layer 170*b* which has been printed be capable of separation from the rest of the roll at any time, which means that it must be torn off, or preferably as shown particularly in FIGURES 4 and 5 it is cut off by shearing means. The shearing means comprises a knife blade 282, FIGURES 4 and 5, operable in a transverse groove 284 in the front wall 12 of the housing. This knife blade has a handle 286 slidably guided in a bore 285 extending transversely in the front wall. The handle terminates at its outer end in a knob 288. Knife 282 is urged to an inoperative position by a compression spring 290 mounted on the handle 286 and confined in a counterbore 292 in the front wall. Knife blade 282 is tapered, and in adidtion the front wall 294 of the groove 284 is angled whereby when the handle is pulled outwardly the shearing edge of the knife moves into the area of feed slot 252 and cuts the tape layer 170*b*. The tapered construction of the knife as well as its angular movement caused by the angled front wall 294 results in an efficient cutting of the tape without tearing.

Sylus 78 projects through a slot 296 in the back-up wall 240, FIGURES 1 and 10, and stylus 146 projects through a slot 298 in said wall. The marking wheels 126 and 128 operate through an opening 300 in this same wall, all of these marking means bearing up against the inner surface of front wall 12 for the purpose of applying markings to the tape. Also as seen in FIGURE 10, front window 13 has a side notch 13*a* which serves as a pencil guide in making notations on the tape.

With reference to FIGURE 11, the tape as supplied for marking has longitudinally disposed sets of reference lines 302 and 304 adjacent opposite edges, the lines 302 being disposed in the area of marking by the stylus 78 for receiving a graph line 306 which shows the speed of operation of the vehicle and the reference lines 304 being arranged to receive a graph line 308 which shows engine operation as marked by the stylus 146. The tape has a central blank area 310 by means of which notations may be handwritten through the window 13 and furthermore has time designations 312 provided therein. In addition there is provided a blank area 314 on which the marking wheels 126 imprint the mileage and another blank area 316 to receive markings 318 as provided by the surface pattern of wheel 128. As seen, the wheel 128 makes five markings to one marking of the wheels 126 and the markings 318 make it easier to take readings in tenths between the markings 314. The tape has a tear line 320, which may comprise a line of perforations, extending longitudinally of the tape centrally through the markings 318. By means of the tear line 320 the tape may be separated into two parts with said parts being taken to different departments for logging or analyzing.

In the operation of the present device, it is apparent that the tape is moving at uniform speed and receives the markings of the stylus 78, the stylus 146, and the marking wheels 126 and 128 to log functions of vehicle operation. Not only is the running speed of the vehicle and the motor performance indicated on the tape but in addition each of these is correlated with mileage indications and the time of day. Thus, the tape can be inspected either during operation of the vehicle or later to determine the running speed and engine operation as well as the time and mileage schedule thereof. The marked tape gathers in compartment 254 and is easily removed by swinging down the auxiliary bottom wall 260. If it is desired to remove the tape prior to completion of a roll, it is first cut by the knife 282. Even though the layer of the tape to be inspected is cut, the pulling layer 170*a* is still engaged between the drive roll 184 and pressure roll 186 and the device keeps on operating as usual.

The parts of the present invention are arranged such that said invention is readily adaptable to vehicles having variable tire sizes and operating speed. That is, merely by changing the drive ratio of the pulleys 54 and 56 operation of the stylus 78 and marking wheels 126 and 128 can be altered. Importantly, no alteration is required in the vehicle structure which drives the take off cable 24. Also to adapt the present device to vehicles which may have a different speed range, the operation of the governor 66 is controlled by suitable substitution of spring 69 of varying forces.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An information recording instrument for a vehicle having a motor adapted to rotate a drive shaft, a housing having enclosing walls, means in said housing arranged to hold a supply of tape of the type having first and second layers, guide means for directing the tape in a selected path in said housing, said guide means having a pair of feed slots arranged to separate the two layers of tape, powered means arranged to engage the first layer of the tape and pull both layers of the tape from the supply thereof at a uniform speed in a longitudinal direction, first marking means in said housing operable to apply markings to the second layer of tape, driven means connected with said marking means and adapted to be driven by the vehicle drive shaft for moving said marking means in recording operating conditions of the vehicle, second marking means movable linearly transversely of the tape and arranged to apply markings to the second layer, and power means connected with said second marking means, said power means being arranged to be operated by the vehicle motor for moving said second marking means in recording operating conditions of the vehicle motor and means defining individual compartments in said housing arranged to individually receive the first and second layers of tape for storing such layers separately after the second layer has received markings from said marking means.

2. The information recording instrument of claim 1 including knife means arranged to cut the second layer of tape.

3. The information recording instrument of claim 1 including auxiliary guide means in said housing having said pair of feed slots therein arranged to receive respectively the layers of the tape, and knife means in said housing movable into the feed slot for the second layer of tape for cutting the latter.

4. An information recording instrument for a vehicle having a motor adapted to rotate a drive shaft, a housing having enclosing walls, a flat strip of tape in said housing, means in said housing arranged to hold a supply of said tape, guide means in said housing for directing said tape in a selected path in said housing, powered means in said housing engageable with the tape and arranged to drive the latter at a uniform speed in a longitudinal direction, first marking means in said housing movable linearly transversely of said tape to apply markings thereon, mileage stamping means in said housing, fractional indicating mileage stamping means in said housing, driven means in said housing connected with said first marking means, said mileage stamping means and said fractional indicating mileage stamping means adapted to be driven by the vehicle drive shaft for moving said first marking means transversely of said tape, and for moving said mileage stamping means and said fractional indicating mileage stamping means into said tape for recording respectively operating speed conditions, mileage conditions and fractional mileage conditions, second marking means in said housing movable linearly transversely of the tape to apply marking means thereon, and power means connected with said second marking means, said power means being arranged to be operated by the vehicle motor for moving said second marking means in recording operating conditions of the vehicle motor.

5. The information recording instrument of claim 4 wherein said mileage stamping means has surface numerals to mark the mileage travelled by the vehicle and said fractional indicating mileage stamping means has surface markings to mark fractional designations adjacent said mileage markings.

6. The information recording instrument of claim 4 wherein said mileage stamping means has surface numerals to mark the mileage travelled by the vehicle and said fractional indicating mileage stamping means has surface markings to mark fractional designations adjacent said mileage markings, said means connecting said driven means with said two mileage stamping means being arranged to move said fractional indicating mileage stamping means into marking engagement with the tape a selected number of times to one marking engagement of said mileage stamping means.

References Cited

UNITED STATES PATENTS

| | | | |
|---|---|---|---|
| 1,471,850 | 10/1923 | Kimes et al. | 346—18 |
| 2,663,609 | 12/1953 | Jones | 346—24 |
| 3,065,467 | 11/1962 | Prevost | 346—24 X |
| 3,188,647 | 6/1965 | Davis | 346—60 |
| 3,200,403 | 8/1965 | Bush | 346—61 |

RICHARD B. WILKINSON, *Primary Examiner.*

J. W. HARTARY, *Assistant Examiner.*